United States Patent [19]

Komori

[11] Patent Number: 5,029,902
[45] Date of Patent: Jul. 9, 1991

[54] COMBINED MAILABLE MAP AND INFORMATIONAL BROCHURE

[75] Inventor: Terunage Komori, Tokyo, Japan

[73] Assignee: WPP - Media, Inc., Tokyo, Japan

[21] Appl. No.: 548,504

[22] Filed: Jul. 2, 1990

[51] Int. Cl.$^5$ .............................. B42D 1/00
[52] U.S. Cl. ........................... 283/56; 283/34; 281/15.1; 229/92.8
[58] Field of Search ............ 281/5, 15.1; 283/34, 283/56; 229/92.8, 71; 40/158.1, 124.1, 155

[56] References Cited

U.S. PATENT DOCUMENTS

| | | | |
|---|---|---|---|
| 3,847,325 | 11/1974 | Masalski et al. | 229/92.8 |
| 3,970,332 | 7/1976 | Alford, Jr. | 283/56 |
| 4,011,985 | 3/1977 | Simson | 283/56 |
| 4,070,778 | 1/1978 | Makler et al. | 40/124.1 |
| 4,167,241 | 9/1979 | Zumbrunn | 229/92.8 |
| 4,289,333 | 9/1981 | Gaetano | 281/5 |
| 4,305,605 | 12/1981 | Vine | 283/56 |
| 4,492,390 | 1/1985 | Jacobs et al. | 283/56 |
| 4,534,581 | 8/1985 | Engh | 281/15.1 |
| 4,685,699 | 8/1987 | Hirasawa | 283/56 |

*Primary Examiner*—Frank T. Yost
*Assistant Examiner*—Hwei-Siu Payer
*Attorney, Agent, or Firm*—Seckelman & Mirowski

[57] ABSTRACT

A compact information brochure for use by a traveller having a cover and at least one page. The cover sheet is folded to define front and rear cover portions. The rear cover portion and has a face with defined regions for receiving address information along with postage, message information, and photographic images. The page is attached internally to the cover sheet and contains map indicia and corresponding map information along with other defined regions for receiving user provided information.

18 Claims, 2 Drawing Sheets

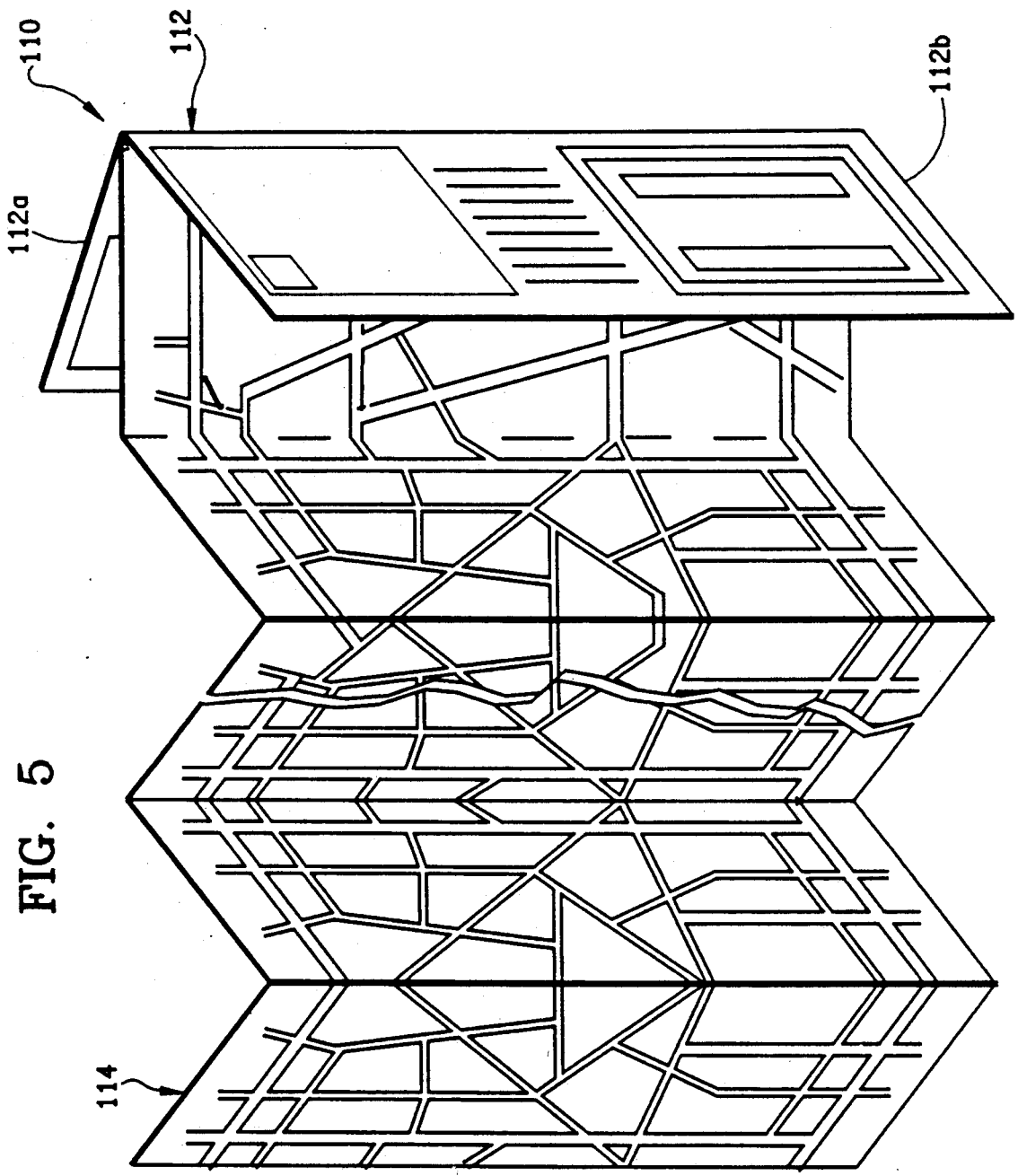

COMBINED MAILABLE MAP AND INFORMATIONAL BROCHURE

BACKGROUND OF THE INVENTION

The present invention relates to tourism. More particularly, the present invention relates to a novel and improved combination tourist map, brochure and postcard which includes a unique layout for the presentation of information useful to the tourist as well as providing places for recording information. The back cover thereof forms a mailable postcard having a layout for receiving a snapshot, message indicia, address information and postage.

In the tourist industry there are many different forms for the presentation of information useful to the tourist. The most commonly used tourist informational aid is a map. Another common form of tourist informational aid is a guidebook. Tourists also tend to purchase and mail postcards, typically bearing photographic images of the area which they are visiting, to friends, relatives and other acquaintances at home.

None of the just mentioned individual traveller's aids combine to form a compact, information-filled, mailable souvenir. Although current maps contain information useful to the traveller, such maps fail to provide room to record the traveller's experiences gained during use of the map.

It is therefore an object of the present invention to provide a novel and improved traveller's brochure which provides the functions of a compact guidebook, map, notebook, and mailer, as a souvenir for sharing with family and friends.

It is yet another object of the present invention to provide in mailable compact brochure form a novel presentation of information useful to a tourist which also enables the recording of experiences in addition to including a portion which may contain a message written by the tourist as well as a photograph attached thereto.

SUMMARY OF THE INVENTION

The present invention is a novel and improved compact information brochure for use by a traveller. The brochure has a cover and at least one page. The cover is formed from a single sheet that is folded to define front and rear cover portions. The rear cover portion is capable of detachment from the front cover portion and has a face with defined regions for receiving address information along with postage, message information, and photographic images. The page is attached internally to the cover sheet and contains map idicia and corresponding map information along with other defined regions for receiving traveller provided information.

The present invention is thus a novel and uniquely combined traveller's map, informational brochure and postcard. The brochure of the present invention includes features which are unique to the design of the brochure. These features include spaces to write and record information and impressions of places visited, and a back cover which serves as a personalized postcard. The back cover is in a postcard format and provides spaces for, affixing a snapshot, affixing a stamp, addressing the postcard and writing a message. When mailed from the place visited the back cover would bear the postmark of the place visited. The postmark and corresponding cancellation information is in many cases a valuable authentication that a visit to the country was actually undertaken.

BRIEF DESCRIPTION OF THE DRAWINGS

The features, objects, and advantages of the present invention will become more apparent from the detailed description set forth below when taken in conjuction with the drawings in which like reference characters identify correspondingly throughout and wherein:

FIG. 5 is a is a perspective view of another form of the menu-mailing-map of the present invention in a partially opened arrangement.

DETAILED DESCRIPTIONS OF THE PREFERRED EMBODIMENTS

Figures 1, 2, 3, 4:
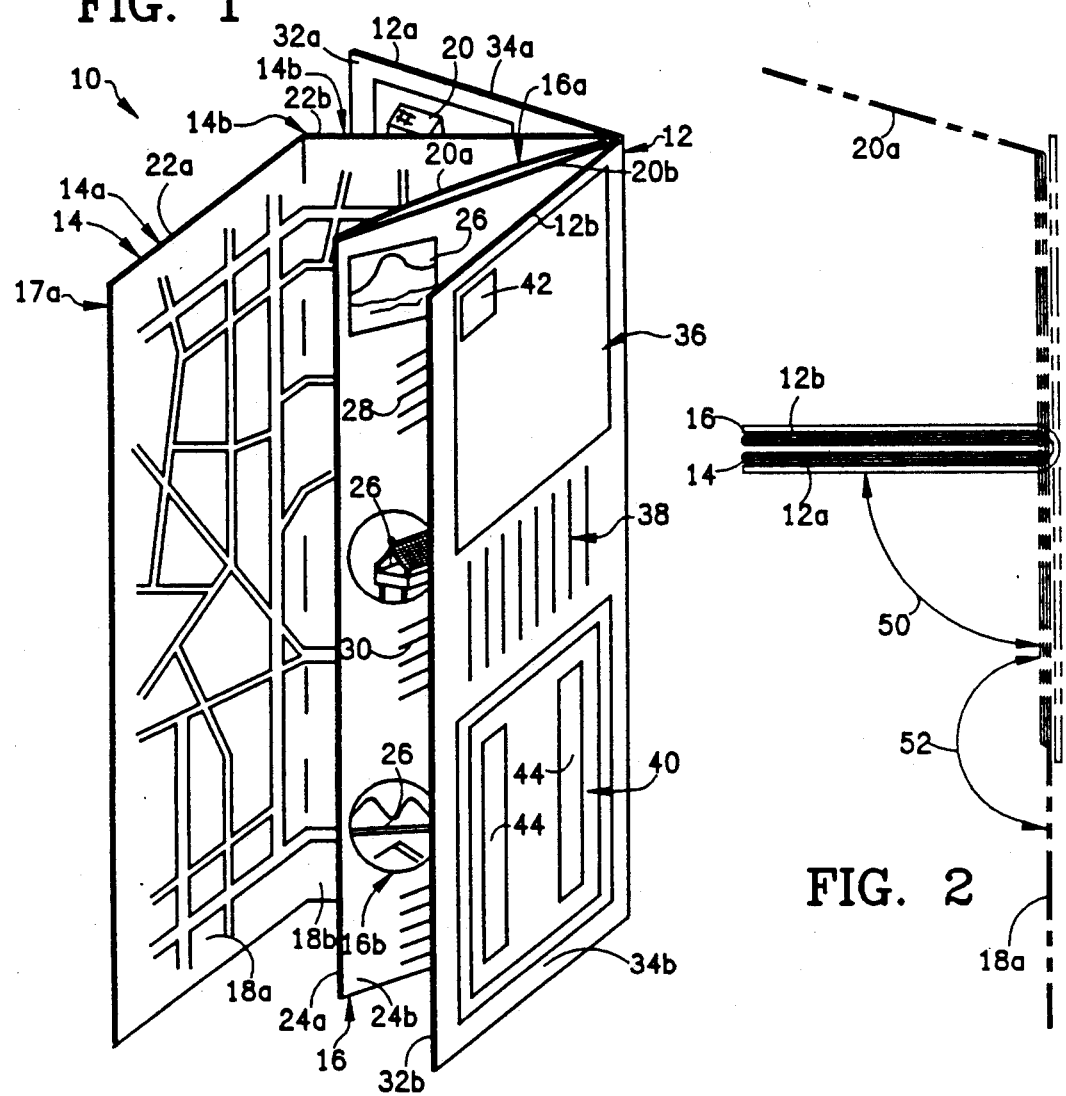
FIG. 1 is a perspective view of one form of the menu-mailing-map of the present invention in a partially opened arrangement.
FIG. 2 is an end elevation view illustrating the menu-mailing-map in various stages from closed to open.
FIG. 3 is a top elevation view of the interior of the menu-mailing-map partially opened.
FIG. 4 is a top elevation view of the interior of the menu-mailing-map completely opened.

Referring now to the drawings, FIG. 1 illustrates an exemplary embodiment of the menu-mailing-map (MMM) of the present invention. In FIG. 1, menu-mailing-map (MMM) 10 is constructed in book form which includes cover 12 and interiors pages 14 and 16. Cover 12 is typically formed from a rectangular sheet of heavy stock paper, of a length greater than the width, which includes a central lengthwise fold so as to define front and rear cover portions 12a and 12b. Cover 12 is formed such that cover portion 12b may be detached from MMM 10.

Pages 14 and 16 are typically formed from a single rectangular sheet of paper of a lighter weight than that of cover 12. Pages 14 and 16 are defined by a central lengthwise fold in the single sheet from which they are formed. Page 14 includes a lengthwise mid-fold so as to respectively define outer and inner page portions 14a and 14b. Similarly, page 16 includes a lengthwise mid-fold so as to respectively define outer and inner page portions 16a and 16b. Page portions 14a and 16a fold inwardly in a manner such that pages 14 and 16 are protected by cover portions 12a and 12b when the pages are folded together. The sheet which form pages 14 and 16 is attached at, or adjacent, the sheet central lengthwise fold to or adjacent the centerfold of cover 12 by means such as staples or glue.

In the embodiment illustrated in FIG. 1, the interior faces of page portions 14a and 14b, respectively faces 18a and 18b, along with the interior faces of page portions 16a and 16b, respectively faces 20a and 20b, contain a printed map. Typically this map may is a panoramic "look down" map of a country, state, region, etc. or an aerial view street map of a major city in the country, state or region of interest. Preferably major landmarks such as buildings and other three dimensional landmarks are illustrated in the street map in a perspective view format with the view taken from above and at a slight angle. Furthermore, bilingual indicia may be included for use in identification of the building. In many instances the location of a landmark or other place of interest by address may be difficult for the tourist to find, particularly when a language barrier exists. The use of illustrated buildings as landmarks and points of reference readily facilitate the location of places of interest without having to find the place of interest by street address. As a further aspect, street names and various other address information is also included and may be in bilingual form.

The exterior faces of page portions 14a and 14b, respectively faces 22a and 22b, along with the exterior faces of page portions 16a and 16b, respectively faces 24a and 24b, contain informational indicia. The informational indicia may include photographs 26 and brief write-ups 28 of various places of interest. Furthermore, demarcated areas 30, typically in the form of blank spaces or blank lines, are also included in the informational indicia. The blank spaces may be used by the traveller to write personal notes regarding their experiences at various places they visit. The interior faces of cover portions 12a and 12b, respectively faces 32a and 32b, may also have similar information indicia thereon, i.e. photographs, write-ups and blank spaces.

The exterior face of cover portion 12a, face 34a, may have printed thereon indicia identifying the locality to which MMM 10 relates along with various other identification and informational indicia. The exterior face of cover portion 12b, face 34b, has a layout which is unique to MMM 10 of the present invention. Face 34b is configured with a postcard-like appearance.

Cover portion 12b has at one end of face 34b, a defined region, address region 36, has printed indicia demarcating an address and postage portion of a postcard. On face 34b adjacent region 36 is a middle region, message region 38, which is demarcated for writing messages. The other end region of face 34b, image region 40, is demarcated for receiving a photographs (not shown) or the like.

Address region 36 typically has a demarcated portion for receiving stamp 42. Within region 36 the address of the recipient is entered by the user. A message is written to the intended recipient in message region 38. A photograph (not shown) or other photographic indicia may be attached to image region 40 by attachment means such as an adhesive or strips of double face tape 44. Cover portion 12b may be detached from cover portion 12a for mailing. As received by the recipient cover portion 12b, will bear the valuable postmark and cancellation date/location of the country visited from which mailed. This postal service applied indicia serves as an "official" record and "proof" of the traveller's visit to that country or locality.

FIG. 2 is an end view of MMM 10 of FIG. 1 illustrating MMM 10 in the closed position (solid lines) and various stages of opening (broken lines). In the fully closed position cover portions 12a and 12b are folded together and overlay folded pages 14 and 16.

In an exemplary opening of MMM 10, as illustrated by arrow 50, cover portion 12a is spread open, i.e. unfolded. Similarly, cover portion 12b is also opened. Pages 14 and 16 may also be opened, i.e. unfolded at the central fold, and lie flat respectively against cover portions 12a and 12b. Page portion faces interior 18a and 18b face one another as page 14 is not yet unfolded at the page mid-fold. Similarly, page portion interior faces 20a and 20b face one another as page 16 is not yet unfolded at the page mid-fold.

Further in FIG. 2, as illustrated by arrow 52, page portions 14a and 14b are unfolded at the mid-fold and lie flat, thus exposing faces 18a and 18b. Page portions 16a and 16b are partially unfolded at the mid-fold and expose faces 20a and 20b.

FIG. 3 provides an illustration of an alternate printing of a map on exterior faces 22a' and 24a' respectively of page portions 14a' and 16a'. In this embodiment a street map in a panoramic "look down" is illustrated showing streets and various buildings. Page portions 14a' and 16a' remain folded at the mid-folds as discussed with reference to FIG. 2 and arrow 50. In this arrangement the printing on faces 22a' and 24a' match to form a single contiguous map. Typically street names, building names, address information and other types of information are bilingually printed. Blank spaces or blank lines are also provided to enter the traveller's own information, such areas being exemplified by the area marked "Street Map" which is marked as such only for purposes of identification of the drawing.

FIG. 4 provides an illustration of the map of FIG. 3 in the fully open position as was dicussed with reference to FIG. 2 and arrow 52. In FIG. 3, pages 14' and 16' are completely unfolded at their respective mid-folds to reveal the printing on the interior faces of page portions 14a' and 14b', 16a' and 16b', i.e. respectively faces 18a' and 18b', and 20a' and 20b'. In this orientation, a map illustrating a larger geographic dimension is presented. This particular map presentation typically includes in coarse detail the map described with reference to FIG. 3. The map illustrated in FIG. 3 may also include indicia indicative of points of interest, landmarks and other information useful to the traveller. Blank spaces or blank lines are also provided to enter the traveller's own information. For example the area marked "Area Map" which is marked as such only for purposes of identification of the drawing may be one such area for recording traveller information.

FIG. 5 illustrates yet another embodiment of the MMM of the present invention. In FIG. 5, MMM 110 is constructed in a manner similar to that of MMM 10 except for the internal pages. MMM 110 includes a cover 112 that is identical to that described with reference to MMM 10. Cover 112 includes front and rear cover portions 112a and 112b, with rear cover portion 112b may again be detachable from front cover portion 112a. The exterior face of rear cover portion includes, as did rear cover portion exterior face 34a in FIG. 1, an address region, a message region and an image region.

MMM 110 of FIG. 5 utilizes a single internal page 114. Page 114 includes an series of lengthwise folds spaced along the width of the page. These folds enable MMM 110 to retain a compact arrangement when folded in a closed position. Page 114 is attached at one side edge thereof internal to cover 112. Traveller information, maps, images and notation areas are printed on page 114, as discussed with reference to FIGS. 1–4.

It is envisioned that many various arrangements of information in the MMM of the may be realized. The MMM of the present invention may also take various forms with respect to shape and size along of the cover and page folds.

It is further envisioned that the MMM of the present invention may be sold as a kit by the distributor. The MMM kit would be packaged to include along with the MMM the means for attaching the photograph, such as strips of double stick tape, along with the proper postal stamp.

It should therefore be understood that the previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but it is to be accorded the widest scope consistent with the principles and novel features disclosed herein.

I claim:

1. A compact mailable information brochure for use by a traveller comprising:
   a cover sheet having a central lengthwise fold so as to define front and rear cover portions, said rear cover portion having a face with defined regions each for respectively receiving address information, postage, message information, and at least one photographic image; and
   at least one page internally attached to said cover sheet, said page containing map indicia and corresponding map information along with other defined regions each for receiving traveller provided information, wherein said page is attached at one side edge to said cover approximate said fold, said page extending widthwise from said cover and having at least one lengthwise fold along the width thereof.

2. The brochure of claim 1 wherein said page has a plurality of lengthwise folds spaced along the width thereof, and said page folds in an accordion arrangement.

3. The brochure of claim 1 further comprising attachment means, disposed upon said rear cover portion at a one of said defined regions for receiving the photographic images, for securely attaching at least one photograph thereto.

4. A compact mailable information brochure for use by a traveller comprising:
   a folded cover sheet defining front and rear cover portions, said rear cover portion having a face with defined regions each for respectively receiving address information, postage, message information, and at least one photographic image; and
   at least one page internally attached to said cover sheet, said page containing map indicia and corresponding map information along with other defined regions each for receiving traveller provided information, wherein said page has central lengthwise fold formed along the width thereof and a pair of lengthwise mid-folds each formed midway between a respective side edge of said page and said center fold.

5. The brochure of claim 4 wherein said mid-folds and said center fold define inner page portions adjacent said center fold and outer page portions adjacent said side edges, said outer page portions being inwardly folded towards a respective adjacent inner page portion at each corresponding mid-fold, and wherein said outer page portions contain printed indicia that is contiguous upon inward folding of said mid-folds.

6. The brochure of claim 3 further comprising attachment means, disposed upon said rear cover portion at a one of said defined regions for receiving the photographic images, for securely attaching at least one photograph thereto.

7. A compact mailable information brochure for use by a traveller comprising:
   a rectangular cover sheet having a length greater than width with a lengthwise fold formed centrally along the width thereof so as to define front and rear cover portions in said cover sheet on opposite sides of said cover sheet fold, said rear cover portion capable of detachment from said front cover portion and having a face with defined regions each for respectively receiving address information, postage, message infomation, and photographic images; and
   at least one rectangular page having a width greater than length with a lengthwise fold formed centrally along the width thereof and a pair of lengthwise mid-folds each formed midway between a respective side edge of said page and said page center fold with said page internally attached to said cover sheet at said page and cover sheet center folds, said page containing map indicia and corresponding map information along with other defined regions for respectively receiving traveller provided information.

8. The brochure of claim 7 wherein said page mid-folds and said page center fold define inner page portions adjacent said center fold and outer page portions adjacent said side edges, said outer page portions being inwardly folded towards a respective adjacent inner page portion at each corresponding mid-fold, and wherein said outer page portions contain printed indicia that is contiguous upon inward folding of said mid-folds.

9. The brochure of claim 6 wherein said cover sheet and said page are formed from paper with said cover sheet being of a heavier stock than said page.

10. The brochure of claim 5 further comprising attachment means, disposed upon said rear cover portion at a one of said defined regions for receiving the photographic images, for securely attaching at least one photograph thereto.

11. The brochure of claim 10 wherein said attachment means comprises at least one strip of a double faced sticker tape.

12. The brochure of claim 10 wherein said attachment means comprises an adhesive layer formed upon said rear cover portion.

13. A compact mailable informational brochure kit for use by a traveller comprising:
   a folded cover sheet defining front and rear cover portions, said rear cover portion capable of detachment from the front cover portion and having a face with defined regions each for respectively receiving address information, postage, message information, and photographic images;
   at least one page internally attached to said cover sheet, said page containing map indicia and corresponding map information along with other defined regions each for respectively receiving traveller provided information;
   attachment means, disposed upon said rear cover portion at a one of said defined regions for receiving said photographic images, for securely attaching at least one photograph thereto; and
   postal stamps for affixing to said rear cover portion at another one of said defined regions for receiving postage.

14. The brochure kit of claim 13 wherein said page is attached at one side edge to said cover approximate said fold, said page extending widthwise from said cover and having at least one lengthwise fold along the width thereof.

15. The brochure of claim 13 wherein said attachment means comprises at least one strip of a double faced sticker tape.

16. The brochure of claim 13 wherein said attachment means comprises an adhesive layer formed upon said rear cover portion.

17. The brochure of claim 13 wherein said page has a central lengthwise fold formed along the width thereof and a pair of lengthwise mid-folds each formed midway between a respective side edge of said page and said center fold.

18. The brochure of claim 17 wherein said mid-folds and said center fold define page portions adjacent said center fold and outer page portions adjacent said side edges, said outer page portions being inwardly folded towards a respective adjacent inner page portion at each corresponding mid-fold, and wherein said outer page portions contain printed indicia that is contiguous upon inward folding of said mid-folds.

* * * * *